US005554842A

United States Patent [19]

Connell et al.

[11] Patent Number: 5,554,842

[45] Date of Patent: Sep. 10, 1996

[54] LUMINESCENT FACING MARKS FOR ENHANCED POSTAL INDICIA DISCRIMINATION

[75] Inventors: Richard A. Connell, South Salem, N.Y.; Thyagaraj Sarada; Richard A. Bernard, both of Norwalk, Conn.

[73] Assignee: Pitney Bowes Inc., Stamford, Conn.

[21] Appl. No.: 362,059

[22] Filed: Dec. 22, 1994

[51] Int. Cl.$^6$ .................................................... G06K 19/06

[52] U.S. Cl. ......................... 235/491; 235/487; 235/494; 283/92; 106/21 A; 209/3.3; 209/584; 209/900

[58] Field of Search .................................... 235/491, 487, 235/494; 283/92; 250/271; 106/21 A; 209/3.3, 584, 900

[56] References Cited

U.S. PATENT DOCUMENTS

| | | | |
|---|---|---|---|
| 3,027,830 | 4/1962 | Yaeger | 101/2 |
| 3,038,607 | 6/1962 | Eckert, Jr. . | |
| 3,236,355 | 2/1966 | Barnard et al. | 198/30 |
| 3,412,245 | 11/1968 | Halverson | 250/71 |
| 3,500,047 | 3/1970 | Berry | 250/71 |
| 4,641,346 | 2/1987 | Clark et al. | 380/3 |
| 4,725,718 | 2/1988 | Sansone et al. | 235/495 |
| 4,949,381 | 8/1990 | Pastore | 380/54 |
| 4,983,817 | 1/1991 | Dolash et al. | 235/462 |
| 5,100,580 | 3/1992 | Powell et al. | 252/301.35 |
| 5,170,044 | 12/1992 | Pastore | 235/454 |
| 5,270,100 | 12/1993 | Giglio | 250/462.1 X |
| 5,289,547 | 2/1994 | Ligas et al. | 382/7 |
| 5,367,148 | 11/1994 | Storch et al. | 235/375 |
| 5,380,992 | 1/1995 | Damen et al. | 250/271 X |
| 5,401,960 | 3/1995 | Fisun et al. | 250/271 |

FOREIGN PATENT DOCUMENTS

| | | |
|---|---|---|
| 59-149578 | 8/1984 | Japan . |
| 0148783 | 1/1985 | Japan . |

OTHER PUBLICATIONS

Japanese Patent Publication No. 14876/1986 "Automatic Mail Processing System Apparatus", Author, Month, and year is missing.

*Primary Examiner*—Donald T. Hajec
*Assistant Examiner*—Michael G. Lee
*Attorney, Agent, or Firm*—Ronald Reichman; Melvin J. Scolnick

[57] ABSTRACT

A postal indicia is disclosed that contains markings thereon which may be used to distinguish between availability or non availability of additional security and sorting information. The foregoing will make the handling of the mail faster and more efficient. The ink that is used to print portions of the indicia is fluorescent for conventional indicia printing and fluorescent and phosphorescent for value added bit map generated printing.

14 Claims, 2 Drawing Sheets

LUMINESCENT FACING MARKS FOR ENHANCED POSTAL INDICIA DISCRIMINATION

CROSS REFERENCE TO RELATED APPLICATIONS

Reference is made to commonly assigned copending patent application Ser. No. 08/362,372 filed herewith entitled "Fluorescent And Phosphorescent Tagged Indicia And Alphanumeric Characters" in the names of Thyagaraj Sarada and Richard A. Bernard.

FIELD OF THE INVENTION

The invention relates generally to the field of postal indicia and more particularly to postal indicia that distinguishes between conventional indicia and indicia having special markings for sorting and handling.

BACKGROUND OF THE INVENTION

The United States Postal Service currently handles large volumes of normal mail i.e., first class mail, second class mail and third class mail. However, when it comes to specialty mail i.e., priority mail, certified mail and registered mail, the United States Postal Service does not have automation capabilities for fast handling of specialty mail. Newer printing technologies like bit map generated indicia are emerging. However, bit map generated indicia has not heretofore been used to improve the handling and sorting of specialty mail. Luminescent inks are currently being used for printing indicia on all normal metered mail, both bit map generated (digital) and traditional impact printing. The luminescence helps machines face the mail. Additionally luminescence may be used for security purposes.

Security is needed for documents that are issued by governments, financial institutions, brokerage houses, postal metering printing and the like. One scheme that has been proposed for providing security is to print authenticating text in invisible or luminescent ink so that the same does not interfere with the document upon which such text is printed, but one, nevertheless, is able to determine the authenticity of the document and the holder of the document as well.

Typically luminescence will become visible to the naked eye when stimulated or excited by suitable radiation. Fluorescent inks and phosphorescent inks are types of luminescent inks. The emission of light from a fluorescent ink is caused by the absorption of energy (light or electromagnetic radiation) into the inks molecule that causes an excited state to emit or be fluorescent and ceases abruptly when the energy source is removed. The emission of light from a phosphorescent ink will persist for a time interval even after the energy source has been removed.

The United States Postal Service is currently selling stamps that have to been printed with a phosphorescent ink and accepting postal indicia that have been printed by a postage meter that uses fluorescent inks. Current fluorescent inks that are used in postage meters approved by the United States Postal Service contain a fluorescent ink that is excited by a 254 nm ultra violet light source that emits a fluorescent light in the orange to red region of the visible spectrum between 580 to 650 nm. Facer Cancellers are being used to cancel stamps that have been affixed to mail pieces and check whether or not the postal indicia are affixed to mail pieces.

A facer canceller is a device for handling, authenticating and sorting randomly oriented letter mail. Facer cancellers check the top and bottom front and back of a mail piece to cancel the stamps thereon and determine if a postal indicia is present. Facer cancellers can also identify a Face Identification Marks (FIM) for pre-addressed, bar coded mail pieces. Facer cancellers have light emitters and detectors that check postal meter indicia for fluorescence and postage stamps for phosphorescence. If a stamp is detected the facer canceller cancels the stamp. There is no need to cancel the detected postal indicia. Current facer cancellers owned by the United States Postal Service are capable of processing approximately 36,000 mail pieces per hour. An example of a facer canceller currently used by the United States Postal Service is the Advance Facer Cancelling System manufactured by Electricom AEG.

Currently luminescence is only being used for facing mail pieces or detecting stamps vs indicia for further processing.

The United States Postal Service uses Postal Validation Imprinting (PVI). In PVI, a red fluorescent band is preprinted along the top edge of a thermal tape for the purpose mentioned above. An actual postal value is printed with a UPC type of bar code at the time of application. The United States Postal Service is the only authorized user of PVI, since PVI in essence are blank stamps that require a high degree of security.

Face Identification Marks hereinafter referred to as FIM are a type of bar code that is printed on mail pieces that may be read by facer cancellers owned by the United States Postal Service. FIM is a type of pre-printed bar code that is printed on the mail piece next to the indicia at a specific location in a specific format. The specific location is defined by the United States Postal Service by very close tolerances, which is currently accomplished only by pre-printing.

Bit map generated indicia as mentioned above may contain postal meter security information and additional security features like control information i.e., encryption information.

Reference may be had to the following patents for further information concerning the state of the prior art.

In U.S. Pat. No. 4,725,718 issued Feb. 16, 1988 entitled "Postage And Mailing Information Applying System" to Sansone et al. there is disclosed a postage and mailing information system wherein an encrypted message based upon postage and mail address information is created.

In U.S. Pat. No. 4,949,381, issued Aug. 14, 1990 entitled "Electronic Indicia In Bit-Mapped Form" to Jose Pastor there is disclosed an item bearing bit-mapped indicia with information encrypted by a public key which verifies a status of the item and a method and apparatus for applying such indicia.

SUMMARY OF THE INVENTION

The present invention overcomes the disadvantages of the prior art by providing a postal indicia that is more versatile. The postal indicia contains more security information which is bit map generated. The new class of indicia will have information based security features calling for appropriate sampling and verification. The invention may also contain markings thereon which may be used for improved sorting and handling of specialty mail pieces. For instance, the markings on the indicia may be used for the sorting of first class mail, specialty mail, out of state mail, local mail, presorted international mail etc. The foregoing will make the handling of the mail faster and more efficient. The new indicia contains: a dollar amount; the date that the postal indicia was affixed to the mail piece; the place the mail piece was mailed from; the postal meter serial number; and additional encrypted security information. All information and graphics shown in the indicia may be printed by any bit map generated printing technology like ink jet, thermal transfer, laser, etc. The inks and toners used to print the indicia could be luminescent or non luminescent. One of the inks that could be used to print the indicia is an ink that is fluorescent and phosphorescent at the same time. Thus, it is more difficult to print fraudulent copies of the indicia. Current desk top printers and color photocopiers are not capable of duplicating fluorescence and phosphorescence at the same time.

The indicia will also have some special markings besides what was heretofore mentioned. These markings may be various geometric shapes, i.e., bars, stars, circles, etc. Any conventional or non conventional printing technology can be used to print the markings. The inks for the special markings could be red fluorescence and/or green phosphorescence, and/or red phosphorescence. The foregoing markings will provide additional sorting and mail discrimination capability. The aforementioned markings provide an additional advantage, since they are digital and do not require analog detectors for their identification. Thus, the foregoing markings could also provide a more practical replacement or alternative to FIM.

An additional advantage of the aforementioned markings is that FIM also requires space on the mail piece which may be used for advertisement and other vital information. A further advantage of the above markings is that FIM is pre-printed to tight specifications and the special markings will achieve the same purpose as FIM without tight specification requirements. The special markings also do not have to be pre-printed on the mail piece and could be generated at the final stages of mail preparation i.e., the time the indicia is printed.

DETAILED DESCRIPTION OF THE PREFERRED EMBODIMENT

Figure 1:
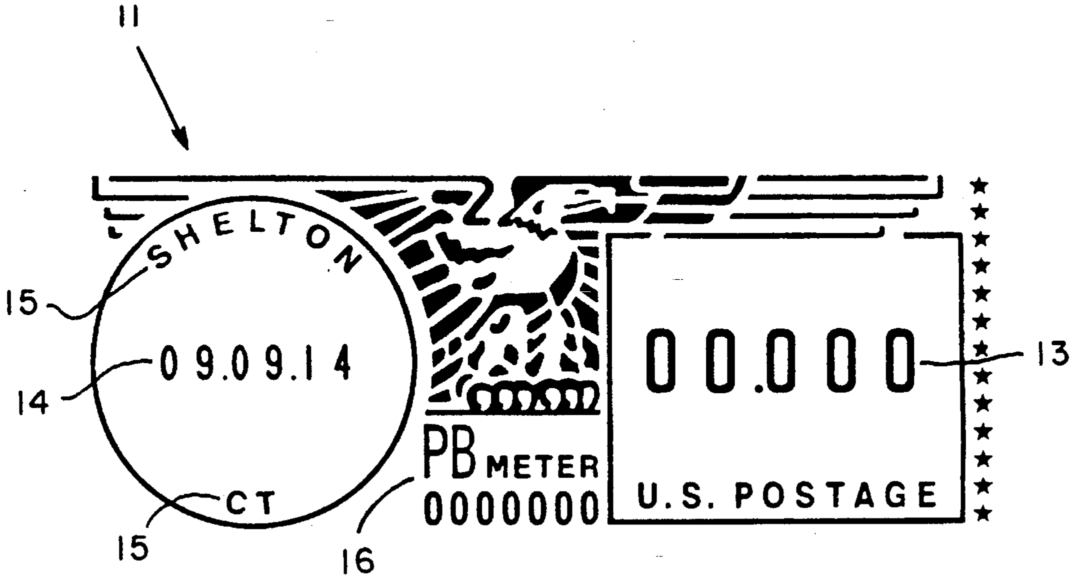
FIG. 1 is a drawing of an indicia containing normal security features (meter number) printed by conventional printing or bit map generated printing.

Referring now to the drawings in detail, and more particularly to FIG. 1, the reference character 11 represents a postal indicia that contains normal security features (meter number) printed by conventional printing or bit map generated printing. The postal indicia 11 contains a dollar amount 13, the date 14 that the postal indicia was affixed to the mail piece, the place the mail piece was mailed from 15 and the postal meter serial number 16 (for authentication).

Figure 2:
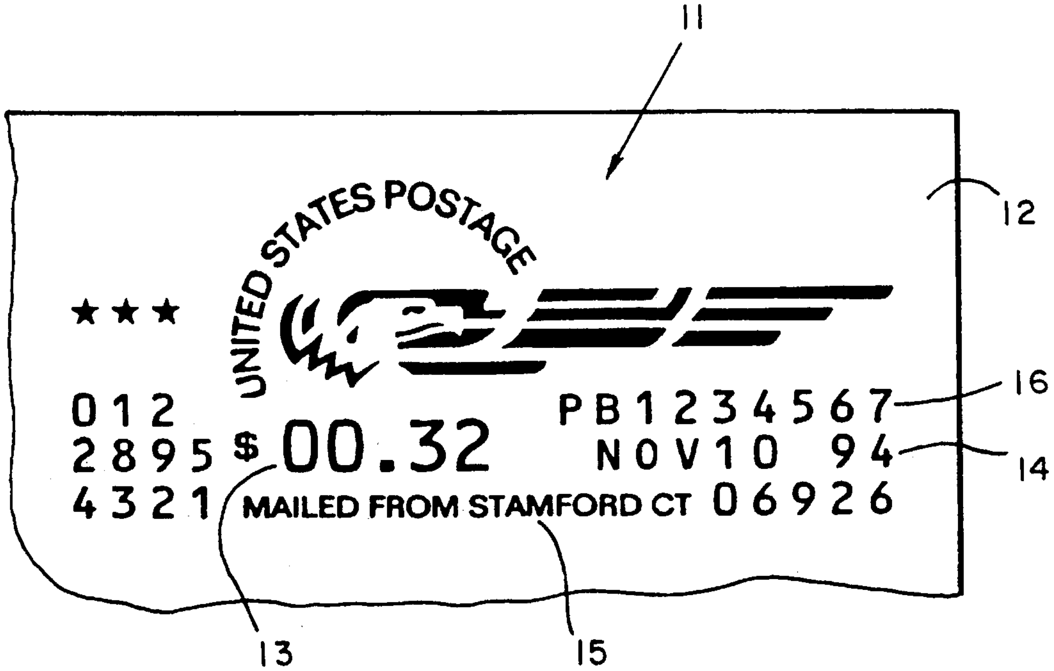
FIG. 2 is a drawing of a bit map generated postal indicia that was printed with an ink that is fluorescent with or without phosphorescence that has additional control information i.e., encrypted data.

FIG. 2 is a drawing of postal indicia 11 that was printed with an ink that is fluorescent with or without phosphorescence that has additional control information i.e., encrypted data. The postal indicia 11 may be printed on mail piece 12 by an ink jet printer or by a thermal printer, or by a laser printer or by any digital printer. The postal indicia 11 contains a dollar amount 13, the date 14 that the postal indicia was affixed to the mail piece, the place the mail piece was mailed from 15 and the postal meter serial number 16 and additionally a security code 10.

Figure 3:
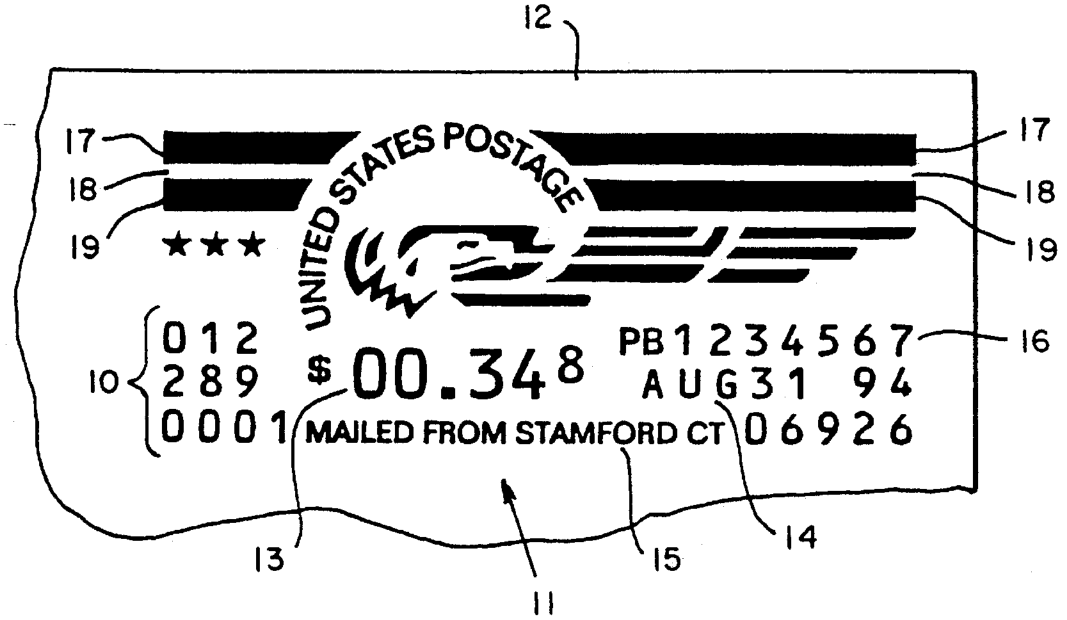
FIG. 3 is a drawing of a postal indicia containing special markings in addition to the information contained in FIG. 2.

FIG. 3 is a drawing of a postal indicia containing special markings, besides the information contained in FIG. 2, which in the example shown are bars. Postal indicia 11 was printed with an ink that is fluorescent with or without phosphorescence. The postal indicia may be printed on mail piece 12 by an ink jet printer. The postal indicia 11 contains a dollar amount 13, the date 14 that the postal indicia was affixed to the mail piece, the place the mail piece was mailed from 15 and the postal meter serial number 16 and a security code 10. In addition the postal indicia 11 will include bars 17, 18 and 19. Bars 17, 18 and 19 may be printed by conventional printing methods. It would be obvious to one skilled in the art that the presence or absence of various states of luminescence may be used. It would also be obvious to one skilled in the art that any type of markings having any geometric shape may be used for bars 17, 18 and 19, i.e., stars, circles, triangles, etc.

In the event that a fluorescent ink currently used for printing postal meter indicia is used, then and in that event sorting information may be encoded into bars 17, 18 and 19. For instance, each of bars 17, 18 and 19 may be printed with the fluorescent ink, none of the bars may be printed with the fluorescent ink, or some of the bars may be printed with the fluorescent ink. Each bar can have two possible states. Hence, eight possible combinations may be encoded in bars 17, 18 and 19.

If bars 17, 18, and 19 were not printed with the ink that is fluorescent no luminescence would be present when bars 17, 18 and 19 were excited with UV light having an appropriate wavelength. This condition may represent a first type of mail. If bars 17 and 18, were not printed with the ink that is fluorescent, and bar 19 was printed with the ink that is fluorescent, bar 19 would experience luminescence when bars 17, 18 and 19 were excited with UV light having an appropriate wavelength. This condition may represent a second type of mail.

If bars 17 and 19, were not printed with the ink that is fluorescent and bar 18 was printed with the ink that is fluorescent, bar 18 would experience luminescence when bars 17, 18 and 19 were excited with UV light having an appropriate wavelength. This condition may represent a third type of mail.

If bar 17 was not printed with the ink that is fluorescent and bars 18 and 19 were printed with the ink that is fluorescent, bars 18 and 19 would experience luminescence when bars 17, 18 and 19 were excited with UV light having an appropriate wavelength. This condition may represent a fourth type of mail.

If bar 18 was not printed with the ink that is fluorescent and bars 17 and 19 were printed with the ink that is fluorescent, bar 18 would experience no luminescence when bars 17, 18 and 19 were excited with UV light having an appropriate wavelength. This condition may represent a fifth type of mail.

If bars 18 and 19 were not printed with the ink that is fluorescent and bar 17 was printed with the ink that is fluorescent, bar 17 would experience luminescence when bars 17, 18 and 19 were excited with UV light having an lo appropriate wavelength. This condition may represent a sixth type of mail.

If bar 19 was not printed with the ink that is fluorescent and bars 17 and 18 were printed with the ink that is fluorescent, bars 17 and 18 would experience luminescence when bars 17, 18 and 19 were excited with UV light having an appropriate wavelength. This condition may represent a seventh type of mail.

If bars 17, 18 and 19 were printed with the ink that is fluorescent, bars 17, 18 and 19 would experience luminescence when bars 17, 18 and 19 were excited with UV light having an appropriate wavelength. This condition may represent a eighth type of mail.

It would be obvious to one skilled in the art that additional bars may be added to bars 17, 18 and 19 to encode additional information to increase the amount of sorting possibilities.

Thus, markings 17, 18 and 19 may be used to sort and improve the handling of the mail including specialty mail.

Another example of the sorting possibilities of this invention is the scheme listed below for the special markings.

States

No luminescence—may imply that the mail should be out-stacked for further consideration Red Fluorescence only—conventional meter indicia, the Advance Facer Cancelling System accepts the mail piece with no cancellation Red Phosphorescence—international stamp, the Advance Facer Cancelling System cancels the stamp Red Fluorescence, Red Phosphorescence—improved conventional indicia, the Advance Facer Cancelling System accepts the mail piece, without cancellation Red Fluorescence, Green Phosphorescence—denotes a form of digital indicia Red Phosphorescence, Green Phosphorescence—denotes another form of digital indicia Red Fluorescence, Red Phosphorescence, Green Phosphorescence—denotes a form of digital indicia for specialty mail Green Phosphorescence—domestic stamp (green phosphorescence would not be used on postal indicia It would be obvious to one skilled in the art that different marking schemes and a combination of luminescence may be used to sort the mail.

Special markings or bars 17, 18 and 19 will eliminate the need for FIM. This improves machine read rates currently obtainable with FIM since it is not dependent on the close tolerances of FIM. Present facer cancellers should be able to read bars 17, 18 and 19 with a minor change in software, since they presently have the capability to detect both fluorescence and phosphorescence.

In the event a ink that is fluorescent and phosphorescent at the same time is used, sorting information may be encoded into bars 17, 18 and 19. For instance: each of bars 17, 18 and 19 may be printed with the ink that is fluorescent and phosphorescent; none of the bars 17, 18, and 19 may be printed with the ink that is fluorescent and phosphorescent; or some of the bars 17, 18, and 19 may be printed with the ink that is fluorescent and phosphorescent. Thus, bars 17, 18 and 19, each have four possible states. Hence, 64 possible combinations may be encoded in bars 17, 18, and 19 without using any additional space. It will be obvious to one skilled in the art that additional bars may be utilized to convey additional information.

The inks that are used to print postal indicia 11 may be applied using conventional printing methods i.e., impact printing or bit map generated imprints (digital) i.e., thermal transfer, laser or ink jet, etc. The inks used to print postal indicia 11 by conventional printing methods are current fluorescent inks. The inks that are used to print postal indicia 11 in bit map generated or digital printing would be specific for the selected printing mechanism and are fluorescent inks.

For printing bars 17, 18 and 19 either conventional or digital printing may be used:

Bar 17, 18 & 19 may be printed with a non fluorescent ink, i.e., a Pitney Bowes non fluorescent ink currently used in the European Market (international fluorescent ink).

Bars 17, 18 and 19 may be printed with a combination of fluorescent a non fluorescent ink, the fluorescent ink for printing postal indicia 11 may be used.

An example of inks that is used to print postal indicia 11 by conventional printing are as follows:

Any Pitney Bowes Postage Meter ink currently in use like 6100 Mailing Machine Inks or Paragon Inks on excitation by 254 nm radiation will produce fluorescence emission centered around 620 nm. For digital printing applications, for example a Hewlett Packard Bubble Jet Print, head with a magenta fluorescent ink cartridge ID No. 51625A may be used. With excitation wavelength 254 nm, it will fluoresce at emission wavelength centered around 606 nm.

The type I ink (Dispersion ink) of this invention is made from vehicles such as Diisooctyl Phthalate (DIOP), Shellflex 4131 with additives eugenol, lecithin, dispersing agents, polyvinylchloride (PVC) and stearate gels. There will be colorants, fluorescent pigments, non fluorescent red dyes and phosphorescent compounds.

The general formula of type I ink of this invention is as follows:

| Type I ink | |
|---|---|
| Vehicle A | Dioctyl Phthalate, or Diisooctyl Phthalate, or Dioctyl Adipate, or Butyl Acetal Recinoleate |
| Vehicle B | Extender and Plasticizer containing severely hydro-treated light napthenic distillate |
| antioxidant | substituted diphenylamine |
| wetting agent | A mixture of digylcerides or stearic, palmitic and/or oleic acids linked to chlorine ester of Phosphoric acid |
| Dispersant | Aluminum tristearate |
| Stabilizing agent | Polyvinyl chloride |
| Deodorant | Eugenol, or Isoeugenol (also used as a secondary antioxidant) [2 Methoxy-4(2-propenyl)phenol] |

-continued

| Type I ink | |
|---|---|
| Non Fluorescent colorants | Red lake C, sodium lithol (C.I. #15630 Brilliant Toning Red) Permanent Red 2B (C.I. #15865) |
| Fluorescent Flushes | |
| Flushes are custom made for different applications. They contain the following: | |
| | Fluorescent pigments that are solid solutions of dyes in friable organic resins. A typical example is a powder containing melamine - sulfonamide and/or melamine - formaldehyde resin that contains various dissolved fluorescent dyes such as Rhodamine B (C.I. #45175). This will produce a blue shade that can be blended with another Rhodamine B dye pigment to produce a yellow shade. A proper mixture of the above is dispersed in a linseed oil based alkyd vehicle to produce the required color. |
| Phosphorescent material | Yttrium oxysulfide, Europium doped ($Y_2O_2S$:Eu) [id #-YSA or YSB]. Yttrium Phosphovanadate, Europium doped [$Y(P,V)O_4$:Eu] [id #YPV-A] |

For certain printing applications currently in use, the type I ink is not applicable. In those instances a solution ink of this invention referred to herein as a type II ink is used. The solution ink contains the following: solvents such as tetra-ethylene glycol, tripropylene glycol, triethylene glycol, diethylene glycol Polyoxyethylene fatty ester (G2109), oleyl alcohol ethoxylate (Ameroxol OE-5). Non ionic surfactants like: Pluracol or Igepal, [alkyllphenoxy poly (ethylenoxy) ethanol]. Various Rhodamine dyes dissolved in melamine polymer of benzene sulfonamide, aromatic methyl formal-dehyde and tetrahydro imidazo [4,5-d] imidazole-2,5 (1H, 3H) dione with a molecular weight average of 1000 to 15,000. Certain non fluorescent dyes to adjust color without destroying the luminescence. The rare earth metal sulfide and vandium phosphorescent compound, Europium doped. Special additivies to keep the ink stable.

The general formula for the type II ink of this invention is as follows:

| | |
|---|---|
| Solvent A | Tripropylene glycol (TPG) and/or tetraethylene glycol (TEEG) or triethylene glycol (TEG) and/or diethylene glycol, (DEG) |
| Solvent B | Polyoxyethylene fatty ester (G-2109) or Dodecyl alcohol ethoxylate (TDA-3) or oleyl alcohol ethoxylate (Ameroxol) |
| Thinning Agent | Propylene carbonate (PC) |
| Surfactant | Igepal CO 530 and/or Igepal CO 610 or Pluracolo |
| Fluorescent Toner | Day Glo HMS series The toners are fluorescent dyes dissolved in Amino or Amide-aldehyde resins i.e, for example Tri-azine modified sulphonamide resin, with Basic Red 1, and/or Basonyl Red 482 and/or, C.I. Solvent 135, Alberta Yellow, and or C.I. Solvent Yellow 60:1, and or C.I. Basic Violet #11, etc. |
| Coloring Dyes | Neptum Red 543 and or Orasol Violet RN |
| Phosphorescent Materials | YSA or YSB YPV-A [$Zn_2SiO_4$.Mn] [id #Sylvania 2284C or 2283C] |

Figure 4:
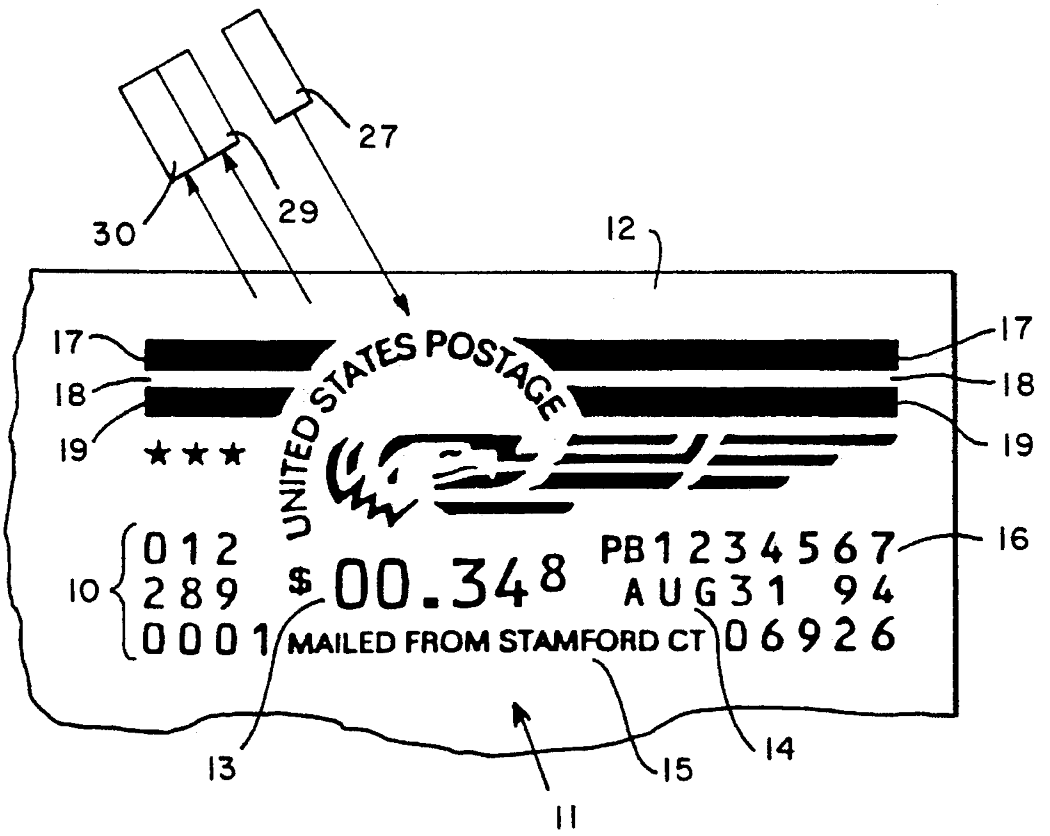
FIG. 4 is a schematic drawing of the detector portion of a facet canceller that is used to detect the markings on the postal indicia shown in FIGS. 1, 2 and 3.

FIG. 4 is a drawing of the detector portion of a facer canceller (not shown) that is used to detect the markings on the postal indicia shown in FIG. 3.

Light source 27 emits light having a wavelengths of 254 nm which illuminates indicia 11. Those portions of indicia 11 that will emit red fluorescence when radiated with light from source 27 will be detected by detector 29. Detector 29 also detects the light emitted by the portions of bars 17, 18 and 19 that exhibited fluorescence i.e. light having wave-lengths centered around 620 nm.

Those portions of bars 17, 18 and 19 that will exhibit green or red phosphorescence in addition to red fluorescence when radiated with light from source 27 will be detected by detector 30. Detector 30 detects the light emitted by the portions of bars 17, 18 and 19 that exhibited green or red phosphorescence i.e. light having wavelengths centered around 540 or 620 nm with light source 27 is momentarily off.

The above specification describes a new and improved method and apparatus for using a postal indicia that has special markings printed with inks that are fluorescent and phosphorescent adding additional features to sort the mail. It is realized that the above description may indicate to those skilled in the art additional ways in which the principles of this invention may be used without departing from the spirit. It is, therefore, intended that this invention be limited only by the scope of the appended claims.

What is claimed is:

1. A method of supplying a mail piece with a postal indicia that is used to sort the mail piece comprising the steps of:

printing a portion of a postal indicia or the entire postal indicia on a mail piece with a ink that is fluorescent and phosphorescent; and reading the portion of the postal indicia to distinguish between conventional indicia and new indicia that contains more information.

2. The method claimed in claim 1, further including the step of:

distinguishing the mail piece in accordance with markings printed with the fluorescent ink that appear on portions of the indicia.

3. The method claimed in claim 2, wherein the step of distinguishing the mail pieces includes:

distinguishiing a first type of mail for verification purposes and further processing;

distinguishiing a second type of mail for verification purposes and further processing; and distinguishiing a third type of mail for verification purposes and further processing.

4. The method claimed in claim 3, wherein the first type of mail, second type of mail and third type of mail are first, second and third digital indicia.

5. A facer canceller having a red fluorescent, red phosphorescent and green phosphorescent detectors, said facer canceller characterized by: that more than one of said detectors are simultaneously activated to register the presence of portions of a mailing indicia that was printed with a ink that is fluorescent when radiated with light having a wavelength of 254 nm and phosphorescent when radiated with light having a wavelength of 254 nm so that the facer canceller may read and use the portions of the mailing indicia printed with a ink that is fluorescent and phosphorescent to distinguish between availability or non availability of security information and sorting information.

6. The facer canceller claimed in claim 5, further including:

means for using portions of the postal indicia to sort the mail.

7. The facer canceller claimed in claim 6, wherein said portion means are luminescent markings.

8. A method of supplying a mail piece with a postal indicia that is used to sort the mail piece comprising the steps of:

printing a postal indicia or a portion of a postal indicia with a ink that is fluorescent and phosphorescent on a mail piece;

reading the postal indicia; and sorting the mail piece in accordance with markings printed on the indicia.

9. The method claimed in claim 8, wherein the printing step further includes:

printing the markings with a fluorescent ink and a non fluorescent ink.

10. The method claimed in claim 9, wherein the reading step further includes the steps of radiating the postal indicia with light having a wavelength of 254 nm so that portions of the postal indicia will experience fluorescence centered around 620 nm.

11. The method claimed in claim 10, wherein the reading step further includes the steps of:

radiating the postal indicia with light having a wavelength of 254 nm so that portions of the postal indicia will exhibit fluorescence centered around 620 nm; and momentarily turning off the radiating light source so that portions of the postal indicia will exhibit phosphorescence centered around 540 or 620 nm.

12. The method claimed in claim 8, wherein said fluorescent phosphorescent ink consists essentially of:

13.5 to 19.4 weight % of fluorescent pigment;

5 to 10 weight % phosphorescent material;

0 to 1.0 weight % wetting agent;

0.45 to 0.5 weight % aluminum sterate;

0 to 0.2 weight % polyvinyl chloride;

0 to 0.5 weight % deodorant;

0 to 1.0 weight % substituted diphenylamine;

2.4 to 4.1 weight % non fluorescent pigments; and the balance consisting of Dioctyl Phthalae, or Diisooctyl Phthalate or Dioctyl Adipate, or Butyl Acetal Recinoleate and/or Extender and Plasticizer containing severly hydro-treated light naphthenic distillate vehicles.

13. The method claimed in claim 8, wherein the step of sorting the mail pieces includes:

sorting first class mail;

sorting priority mail;

sorting registered mail;

sorting out of state mail;

sorting local mail;

sorting presorted international mail;

sorting certified mail; and sorting national mail.

14. The method claimed in claim 8, wherein said fluorescent phosphorescent ink consists essentially of:

30 to 35 weight % of fluorescent toner;

1 to 5 weight % phosphorescent material;

15 to 32 weight % primary solvent A;

26 to 42.5 weight % solvent B;

3 to 4 weight % proplyene carbonate;

3.5 to 5 weight % surfactant; and 0.2 weight % coloring dyes.

* * * * *